United States Patent
Shin

(10) Patent No.: US 6,993,903 B2
(45) Date of Patent: Feb. 7, 2006

(54) STATOR BLADE MOUNTED IN A TORQUE CONVERTER

(75) Inventor: Se-Hyun Shin, Daegu (KR)

(73) Assignee: Korea Powertrain Co., Ltd, Daegu (KR)

( * ) Notice: Subject to any disclaimer, the term of this patent is extended or adjusted under 35 U.S.C. 154(b) by 99 days.

(21) Appl. No.: 10/467,645

(22) PCT Filed: Feb. 12, 2003

(86) PCT No.: PCT/KR03/00298

§ 371 (c)(1),
(2), (4) Date: Aug. 7, 2003

(87) PCT Pub. No.: WO2004/020874

PCT Pub. Date: Mar. 11, 2004

(65) Prior Publication Data

US 2004/0237516 A1    Dec. 2, 2004

(30) Foreign Application Priority Data

Aug. 30, 2002  (KR) ..................... 10-2002-0051922

(51) Int. Cl.
*F16D 33/00*     (2006.01)

(52) U.S. Cl. .................. 60/362; 60/345; 60/365
(58) Field of Classification Search ............... 60/345, 60/361, 362, 365
See application file for complete search history.

(56) References Cited

U.S. PATENT DOCUMENTS

| | | | | | |
|---|---|---|---|---|---|
| 2,205,794 | A | * | 6/1940 | Jandasek | 60/362 |
| 2,755,628 | A | * | 7/1956 | Mamo | 60/362 |
| 4,848,084 | A | * | 7/1989 | Wirtz | 60/342 |

* cited by examiner

*Primary Examiner*—Edward K. Look
*Assistant Examiner*—Michael Leslie
(74) *Attorney, Agent, or Firm*—GWiPS

(57) ABSTRACT

The present invention is related to a blade of a stator, where a passage is formed in the blade of a conventional stator which constitutes a torque converter and thereby generates stable torque and prevents sag in the stall state and at low speed ratios. The present invention is characterized in that an oil flow passage is newly formed between the pressure side and the suction side of the blade of the stator. The present invention avoids the occurrence of flow separation and recirculation regions at low speed ratios through modification of the structure of the blade of the stator and thereby prevents performance deterioration and may improve the overall performance of the torque converter.

10 Claims, 4 Drawing Sheets

STATOR BLADE MOUNTED IN A TORQUE CONVERTER

BACKGROUND OF THE INVENTION

1. Field of the Invention

This invention is related to a fluid coupling torque converter, in particular to a stator blade of a torque converter arranged between the impeller and the turbine, which forms two sections of inner ring and outer ring arranged at a predetermined spacing from each other and has space functions as a slot-shaped passage for passing through from the pressure side of the upstream to the suction side of the downstream.

2. Related Prior Art

The fluid coupling torque converter comprising an impeller, which rotates integrally with the torque axle, a turbine rotated by the oil discharged by the impeller, and a stator, which directs the oil flowing back from the turbine to the impeller in the rotation direction of the impeller, has already been disclosed.

In the above mentioned torque converter, the oil discharged from the impeller flows into the turbine, the turbine is rotated by the flowing energy of the oil, then the flowing oil flows back to the impeller from the turbine to convert the rotating direction of the impeller by the stator. The returning oil flow provides a hydrodynamic force on the suction side of the impeller and the rotation of the impeller is increased, and the process of rotating the turbine is repeated by the oil discharged from the impeller with increased rotation, and thereby the turbine generates greater torque than that of the impeller.

Although the conventional stator for the above mentioned torque converter comprises a sheet shaped blade, when the flow of oil enters the stator, the flow direction of the oil and the entrance direction of the flat plate-shaped blade are at an attack angle such that the flow may not enter smoothly, which causes turbulent oil flow and has the problem of decreasing the torque transmission efficiency of the torque converter due to the dynamic energy possessed by the oil being converted into heat energy and being lost.

Therefore, currently all torque converters comprise wing-shaped or hydrofoil shaped blades. In the wing-shaped blade of the stator as such, when the oil flows into the stator blade, the flow may enter smoothly even at a certain difference in angle between the flow direction of the oil and the entrance angle of the blade due to the geometrical characteristics of the leading edge portion.

However, by observing the oil flow around the wing-shaped stator blade, it has been found that when the wing-shaped blade of the stator is at a stall state, the blade may not convey the flow smoothly even if the stator blade is wing-shaped, as depicted in FIG. 4.

Here, the stall state refers to the state where the speed ratio is zero, and the speed ratio refers to the ratio of the rotation speed between the turbine and the impeller. That is to say, the stall state refers to a state where the impeller receives the power from the engine and rotates at the rotation speed of the engine, and the turbine is at a stop due to the driver applying the brakes.

The oil flow around the stator blade, as shown in FIG. 4, may be described in detail as follows: In a state where the speed ratio is in the stall state or low, the turbine is either at a stop or rotating at a low speed and the flow that has left the turbine outlet enters the pressure side of the stator blade from the lower left side of the leading edge of the stator blade with a relatively large angle of attack. Here, the flow separates from the suction side, accompanied by flow recirculation, and as a result the oil is not conveyed sufficiently to the rotation direction of the impeller. Due to this misaligned flow the hydrodynamic force on the suction side is reduced and the rotation of the impeller may not be achieved to the desired amount, and thereby the performance of the torque converter deteriorates, which is the so-called sag phenomenon.

With the sag phenomenon as such, when the speed ratio gradually increases, the rotational speed of the turbine increases and accordingly the angle of attack of the flow entering the stator decreases leading to smooth flow around the stator blade.

Therefore, to prevent the sag phenomenon at the stall state, the forming of a plurality of openings on the stator blade has been disclosed as one example. However, forming a plurality of openings on the stator blade has the following problems.

Namely, in the case of forming a plurality of openings on the stator blade (8), the high energy flow impinging on the pressure side of the stator blade (8) with a large angle of attack will be transmitted to the suction side through the openings, and the effect of minimizing the loss of momentum due to impact at the pressure side may be achieved, and may somewhat increase the efficiency of the fluid machine. However, as depicted in FIG. 7, this plurality of openings formed on the stator blade may not completely prevent flow separation and recirculation, which have direct influence on the performance of the torque converter. That is, in the case of stall state or low speed ratio, when the flow from the turbine outlet enters the stator blade with a large angle of attack, the flow reaching the front part of the pressure side first flows in the downstream direction of the pressure side or flows around the leading edge, which is in the opposite direction, and becomes separated on the suction side of the stator blade, and only a small amount passes through the openings and forms a flow to the suction side. As disclosed in the aerodynamic theory of wings, blowing through openings does not have much effect to prevent flow separation, but rather suction flow is known for effects preventing flow separation. Therefore, as depicted in FIG. 7, in the suction side of the stator blade (8) having a plurality of openings, flow separation and flow recirculation still occur and as the jet stream which passes through the openings mixes with the main flow, even more turbulence is incurred and a complex flow structure is formed which decreases the performance of the fluid machine.

SUMMARY OF THE INVENTION

The present invention is set forth with the foregoing as background, where the object thereof is to form an optimal slot-type opening between the pressure side and the suction side of the stator blade for flow of oil to prevent flow separation and flow recirculation around the stator blade at all times and thereby prevent the sag phenomenon.

To achieve the foregoing object, a stator blade in a fluid torque converter comprising an impeller which is attached to a crankshaft through a connecting member and rotates integrally with the crankshaft, a turbine which is rotated by the oil discharged from the impeller and which the rear end thereof is coaxially attached to the transmission shaft, and a stator which is attached to a fixed stator shaft through a one-way clutch and directs the flow of oil flowing back to the impeller from the turbine to the rotation direction of the impeller and comprises numerous wing-shaped blades formed between the inner ring and outer ring, is characterized in that the stator blade is formed of two sections arranged at a predetermined spacing from each other, and on the blade there is a space defined by the two sections, the inner ring and the outer ring, and where the space functions as a slot-shaped passage which passes through from the pressure side being the upstream of the flow direction to the suction side being the downstream, and the blade has a slot-shaped passage formed in the blade in the angle range of −5° to +40°, and where the angle is defined as the angle formed by the center axis of the slot-shaped passage which bisects the predetermined spacing positioned at a predetermined position on the mean camber line and the parallel line of the tangent line at the outlet point of the design path of the turbine blade.

DETAILED DESCRIPTION OF THE PREFERRED EMBODIMENTS

The preferred embodiments of the present invention are described hereinafter with reference to the attached drawings.

Figure 1:
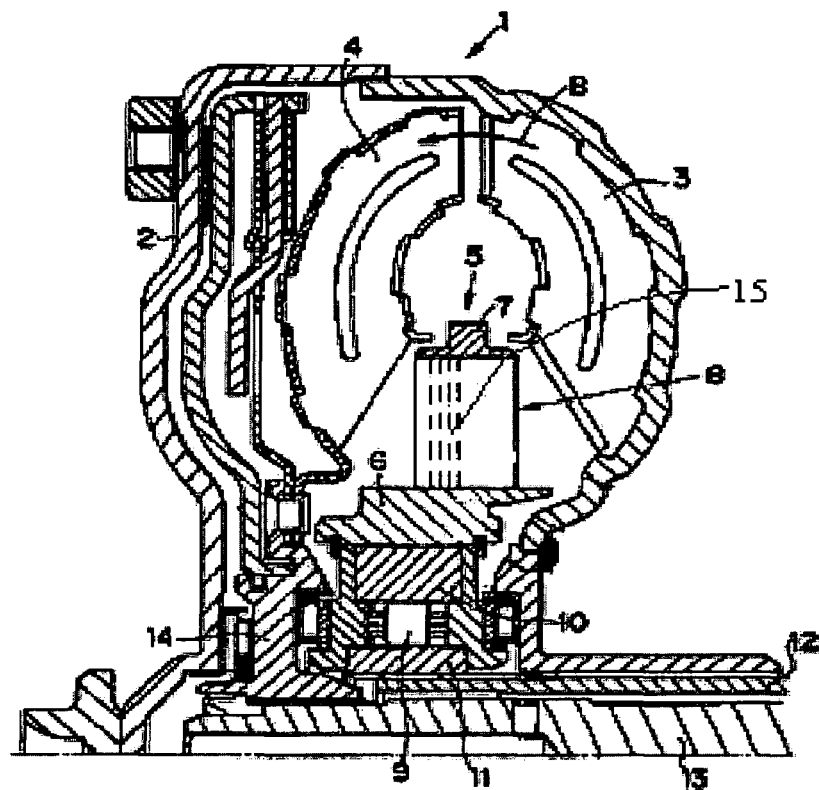
FIG. 1 is a longitudinal cross-sectional diagram of the torque converter employing the stator of the present invention.

As depicted in FIG. 1, the fluid torque converter (1) is comprised of an impeller (3) which is coaxially attached to a crankshaft through a connecting member (2) and rotates integrally with the crankshaft, a turbine (4) which is rotated by the oil discharged from the impeller (3) and which the rear end thereof is coaxially attached to the transmission shaft (13), and a stator (5) which is attached to a fixed stator shaft (12) through a one-way clutch (9) and directs the flow of oil flowing back to the impeller (3) from the turbine (4) to the rotation direction of the impeller (3).

In the above composition, when the impeller (3) rotates, the oil within the impeller (3) is discharged toward the turbine (4) as shown by arrow B, and the turbine (4) is rotated in the same direction as the impeller (3) by the oil. As such, the oil entering the turbine (4) rotates the turbine (4) and at the same time flows out toward the stator (5) by reaction. Here, at the common state where the rotational speed of the turbine (4) is lower than that of the impeller (3), the oil flows in the rotation direction of the turbine, that is, a flow which has the circumferential velocity in the opposite direction from the rotation of the impeller (3). Then, the oil flow which has the circumferential velocity in the opposite direction from the rotation of the impeller (3) is converted to a flow having circumferential velocity in the same direction as the rotation of the impeller (3) by numerous stator blades (8) arranged in the circumferential direction within the stator. Then, the oil having circumferential velocity in the same direction as the rotation of the impeller (3) flows into the impeller (3), and reaches the suction side of the blade of the impeller (3) and thus increases the rotation of the impeller (3). The oil is repeatedly discharged from the impeller (3) with increased speed as such, and the torque is conveyed to the turbine (4). When this process is repeated, the torque conveyed to the turbine (4) becomes greater, and the torque of the impeller (3), that is, the torque greater than that of the crankshaft, is conveyed to the turbine (4) and the increased torque as such is conveyed to the transmission shaft (13).

The stator (5) includes numerous wing-shaped blades (8) between the inner ring (6) and the outer ring (7), and the inner ring (6) is spline-fitted onto the outer lace (10) of the one-way clutch (9). Also, the inner lace (11) of the one-way clutch (9) is spline-fitted onto the stator shaft (12), and the hub (14) is spline-fitted onto the transmission shaft (13) arranged on the inner circumference of the stator shaft (12), and the turbine (4) is mounted on the hub (14).

In the stator (5), on the wing-shaped blades (8), slot-shaped openings (15) are formed to allow the flow of oil from one side of the blade to the other.

Figure 2A:
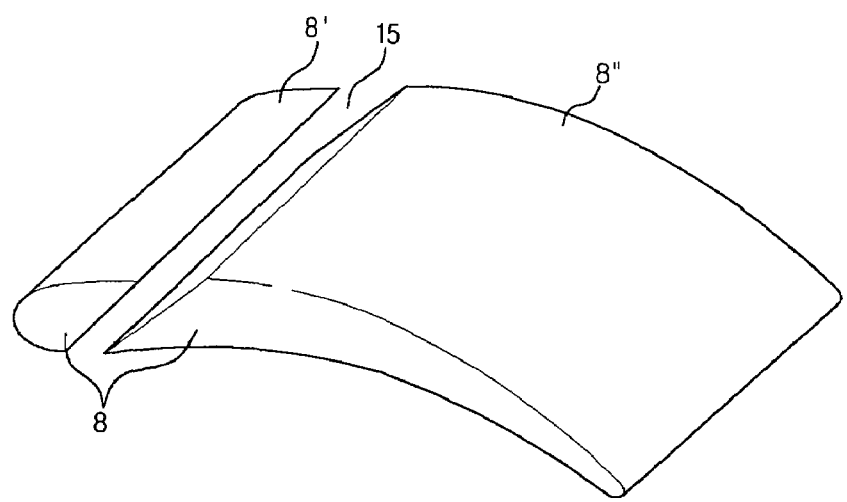
FIG. 2a is a perspective view of one preferred embodiment of the stator blade according to the present invention.
Figure 2B:
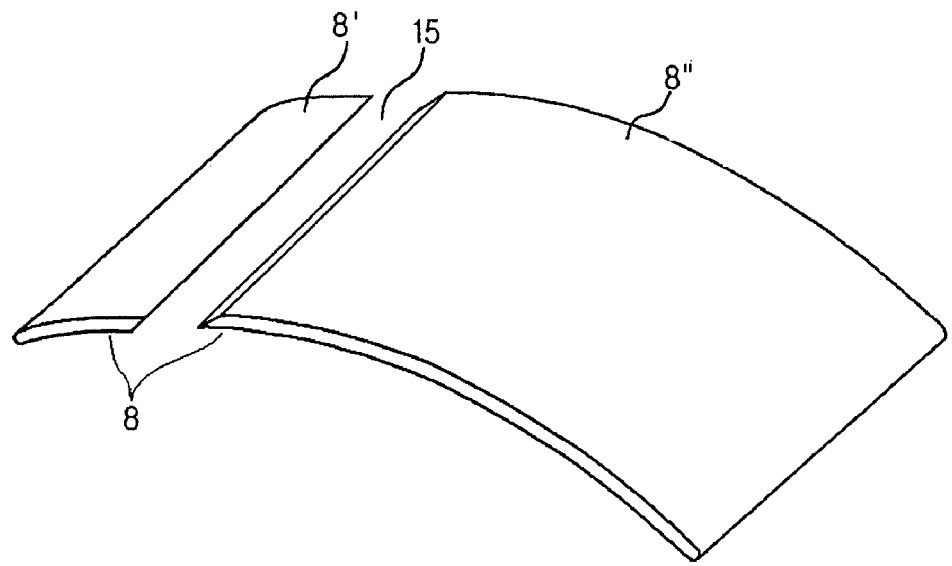
FIG. 2b is a perspective view of a sheet shaped stator blade according to another preferred embodiment of the present invention.

For a detailed description, as depicted in the perspective diagram of one preferred embodiment of the wing-shaped blade (8) in FIG. 2, the wing-shaped blades (8) are hollow, and the outer surface is formed of a concave-surfaced suction side and a convex-surfaced pressure side. Also, the wing-shaped blade (8) of the stator, as depicted in FIG. 2, includes two sections (8', 8") arranged at a predetermined spacing from each other, and on the blade (8) there is a space defined by the two sections (8', 8"), the inner ring (6) and the outer ring (7), which functions as a slot-shaped passage (15) which passes through from the pressure side being the upstream of the flow direction to the suction side being the downstream.

Figure 4:
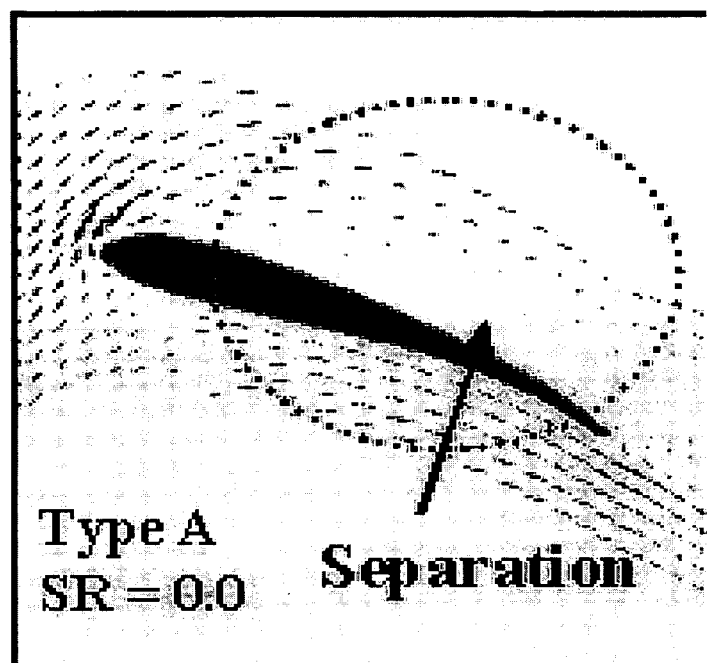
FIG. 4 is a diagram showing the oil flow around the conventional stator blade at the stall state.

As depicted in FIG. 4, although in the conventional wing-shaped blade of the stator flow separation and flow recirculation occurred around the suction side of the wing-shaped blade of the stator, in the wing-shaped blades (8) of the stator (5) according to the present invention provided with the passage (15), flow separation and recirculation around the blade may be prevented by the flow of oil flowing out to the vicinity of the downstream suction side.

Figure 3:
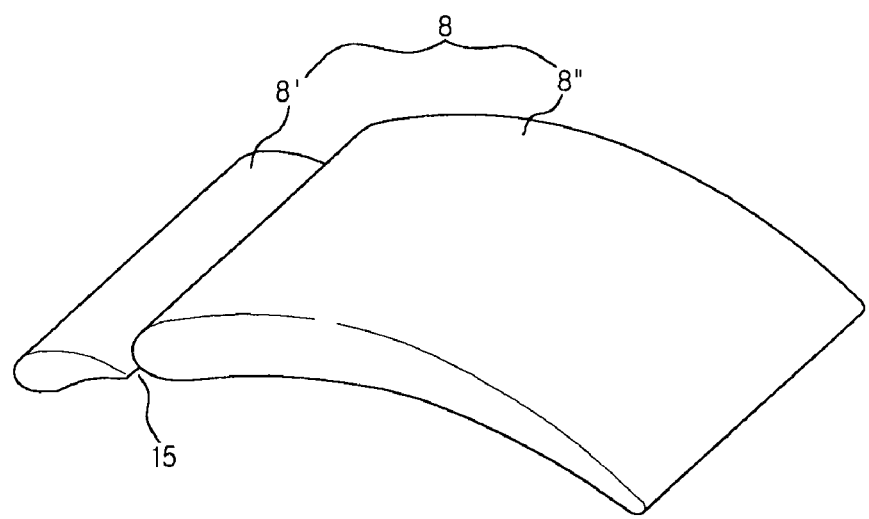
FIG. 3 is a perspective view of the second preferred embodiment of the stator blade according to the present invention.

In the first preferred embodiment of the present invention, as depicted in FIG. 2, the overall shape of the combination of the two sections (8', 8") simply spaced at a predetermined length is wing-shaped, and the individual shape of the two sections (8', 8") is not wing-shaped. However, in the second preferred embodiment of the present invention, as depicted in FIG. 3, it is preferred that the two sections (8', 8") themselves are formed wing-shaped.

As disclosed in the fluid mechanics text book (Fluid Mechanics, Vol. 3, F. M. White, McGraw Hill pp.423–431), for flow shapes experiencing varying angles of attack, lift force and flight performance may be improved by attaching another small assistance blade (called a flap or slat) on the leading edge and the trailing edge of the main blade in such a way that active movement of the small assistance blades can approximate the effect of a variable wing, by altering the overall angle and shape of the blade system during takeoff and landing. Starting off at this concept, the torque converter is an environment where the angle of the blade may not be actively altered, but in the case of the present invention, regarding the flow at a large angle of attack in the existing stator blade, in the case that it is a double blade with an assistance blade attached in front of the leading edge, or a double blade structure is obtained by adequately forming a slot in the existing stator blade, it is possible to allow smooth flow along the stator blade without flow separation even for large angles of attack. FIG. 3 is a preferred embodiment of the present invention, where a double blade structure has been obtained by adequately forming a slot on the existing blade, which exhibits almost complete removal of flow separation and shows smooth flow on the surface of the blade regardless of the large angle of attack, and therefore improvement in the performance indicators may be anticipated. Although, in the case of the blade of an aircraft, the obvious main objective is to obtain a stable lift force, in the present invention the objective is to turn the flow without inducing flow separation, even at large angles of attack, and thereby reduce the drag force. When the drag force is reduced within the torque converter, the speed of the fluid increases and the performance indicators improve, especially the input capacity factor.

The operation of the stator (5) composed as above is described hereinafter. At the state where the speed ratio is zero (stall state) or close to zero, the oil entering from the lower left portion of the leading edge of the blade (8) of the stator (5) flows at a large angle of attack against the stator blade (8), and the direction thereof may be altered by the blade (8). In that case, as depicted in FIG. 4, the speed distribution at the boundary layer near the surface of the blade (8) changes as it progresses from the leading edge of the blade to the trailing edge (8), and when unable to flow along the surface of the blade, flow separation occurs at that point. However, in the stator (5) according to the present invention, the oil entering the blade (8) passage at a small incidence angle goes around the leading edge of the blade (8), and as depicted in FIG. 5, the oil entering the blade (8) at a large incidence angle is discharged to the suction side of the blade through the passage (15) newly formed on the blade, and thus flows out downstream without causing oil flow separation regions and recirculation regions on the suction side of the stator blade and thereby prevents pressure loss, and in other words, is able to assist in the improvement of transmission ratio.

Figure 5:
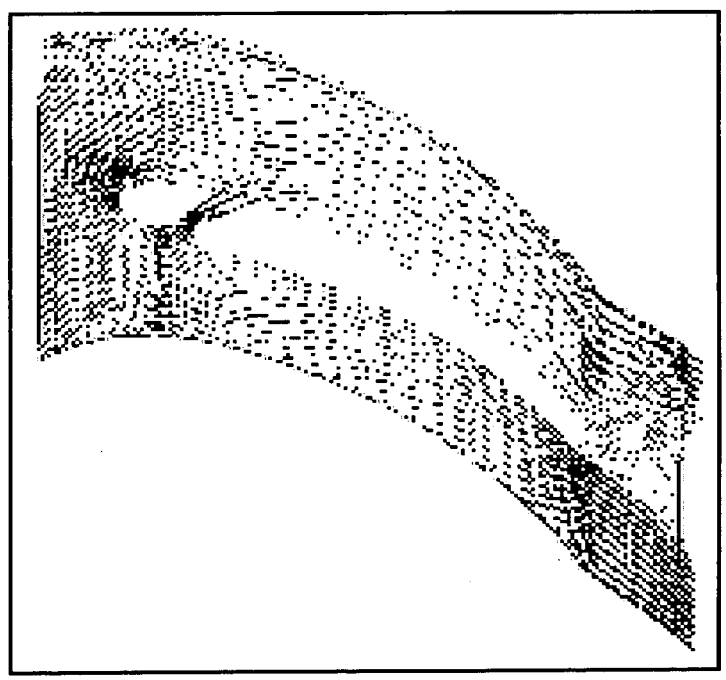
FIG. 5 is a diagram showing the oil flow around the stator blade according to the present invention at the stall state.

In addition, in the above description, when the passage (15) is formed on the wing-shaped blade (8) of the stator, as depicted in FIG. 5, it has been experimentally proven that flow separation regions and recirculation regions do not occur on the suction side of the stator blade. Furthermore, even if the stator blade (8) is a center camber sheet shaped blade which is not wing-shaped, when the surface is formed of a convex pressure side and a concave suction side and when a slot-shaped oil flow passage (15) which passes through the stator blade (8) is provided along the upstream pressure side to the downstream suction side, it is experimentally proven that the phenomenon shown in FIG. 4, namely flow separation, is prevented by the flow of oil being discharged to the downstream suction side from the passage.

The optimum conditions for the stator blade (8) are described hereinafter.

Figure 6:
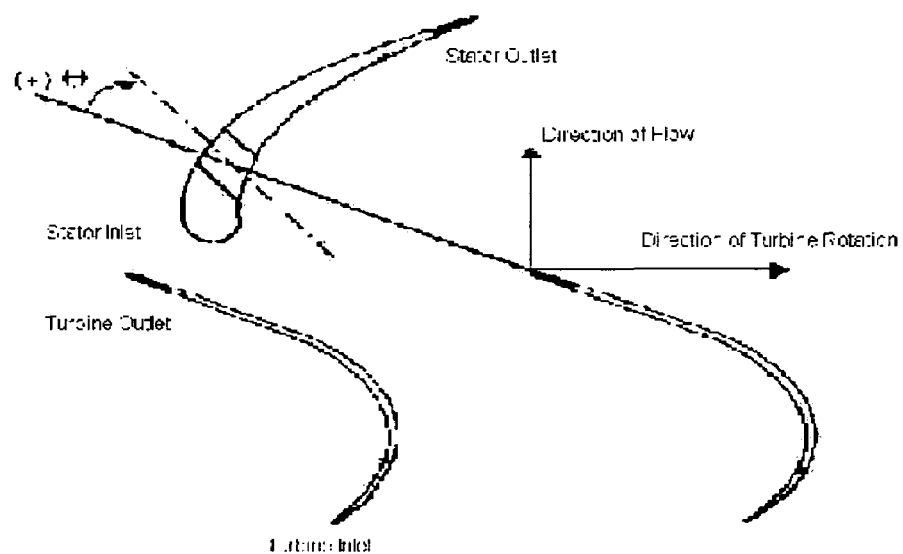
FIG. 6 is a diagram showing the angle of the stator blade of the present invention against the impeller blade.
Figure 7:
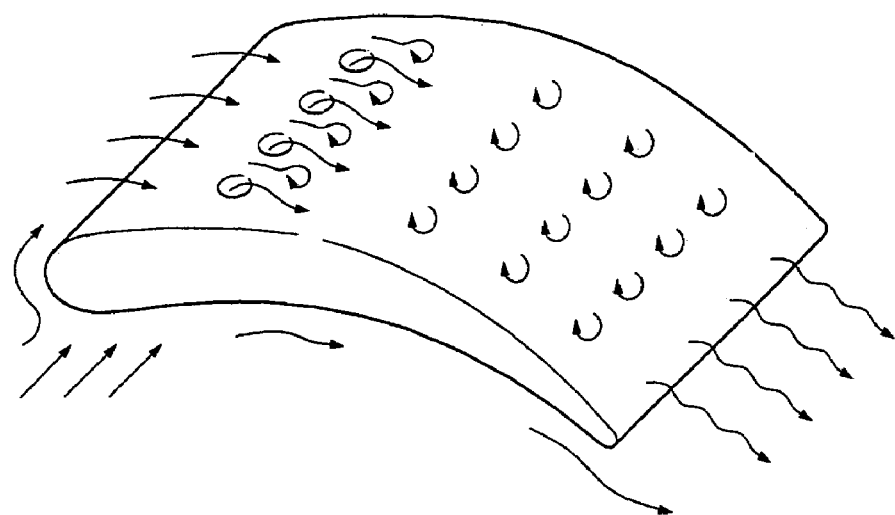
FIG. 7 is a diagram showing the oil flow around the conventional stator blade with a plurality of openings in the stall state.

The optimum angle for the passage formed on the stator blade (8) according to the present invention is limited to the angle (θ) as depicted in FIG. 6, where this angle is defined as the angle formed by the center axis of the of the slot-shaped passage which bisects the space between the two sections (8', 8") and the line tangent to the design flow path at the outlet point of the turbine blade. When the line extended from the outlet point of contact of the turbine blade is parallel to the center axis of the passage, the angle of the passage is 0°, and the angle that the center axis of the passage makes toward the direction of the main flow is defined as the positive amount (+) of the passage angle.

For the present invention to be effective, numerous passage angles have been systematically tested, resulting in the data of table 1. Namely, as a result of researching the change in the torque ratio (TR) and the input capacity factor (CF), which are used as the main performance indicators of torque converters, according to the altering of the passage angle, it has been found that the input capacity factor increases over 10% within the optimum angle range of −5° and +40°, and that the torque ratio is almost identical to the values of the conventional blade without the passage. The input capacity factor improvement as such has been verified to be due to the reduction or elimination of flow separation and recirculation at the suction side by the new flow through the passage as depicted in FIG. 5, which is the object of the present invention. FIG. 5 is a preferred embodiment of the present invention where the passage angle is 10°. However, when the passage angle is below −5° or over 40°, the performance indicators largely decrease as shown in table 1, and therefore, for the present invention to be effective, embodiment in the optimum angles as stated above is essentially required.

TABLE 1

The variations in Torque Ratio and Input Capacity Factor according to the Passage Angle

| | Passage Angle (θ) | | | | | | | | | Standard Blade |
|---|---|---|---|---|---|---|---|---|---|---|
| | −10 | −5 | 0 | 5 | 10 | 20 | 30 | 40 | 50 | (w/o passage) |
| TR | 1.85 | 1.87 | 1.88 | 1.88 | 1.89 | 1.88 | 1.88 | 1.87 | 1.75 | 1.87 |
| CF | 2.5 | 2.64 | 2.70 | 2.74 | 2.75 | 2.72 | 2.70 | 2.67 | 2.3 | 2.60 |

In addition, the existence of an optimum position for the passage formed in the stator blade (8) has been researched by the present invention. First, the definition of the position for the passage refers to the percentile representation of the distance ratio of the distance from the leading edge to the intersecting point of the chord line and a perpendicular line starting from the intersection of the mean camber line of the stator blade (8) and the center axis of the passage, compared to the length of the whole chord which is the straight distance from the leading edge of stator blade (8) to the trailing edge. Although various distances may be realized, as a result of systematic experiments for the present invention to be effective, the results are shown in table 2. Namely, as the position of the passage is varied, in the case where the position is adequate, the input capacity factor (CF) is improved greatly, whereas where the position is not adequate the performance is greatly deteriorated and even causes severe decline in the torque ratio. The result of this research is organized in table 2.

Namely, in the optimum position range of 12% to 38% the input capacity factor (CF) is improved without decline of torque ratio, whereas at other positions the input capacity factor and torque ratio severely decline and cause results inferior to the standard blade values. Therefore, as shown in table 2, for the present invention to be effective, embodiment of the passage in the optimum position is essentially required.

TABLE 2

The variations in Torque Ratio and Input Capacity Factor according to the Passage Position

| | Passage Position (%) | | | | | | | | | Standard Blade |
|---|---|---|---|---|---|---|---|---|---|---|
| | 6 | 12 | 18 | 24 | 32 | 38 | 44 | 56 | 62 | (w/o passage) |
| TR | 1.80 | 1.87 | 1.88 | 1.88 | 1.89 | 1.88 | 1.78 | 1.77 | 1.75 | 1.87 |
| CF | 2.60 | 2.73 | 2.75 | 2.84 | 2.85 | 2.72 | 2.60 | 2.55 | 2.53 | 2.60 |

Meanwhile, the area of the passage is a main variable and therefore the passage area ratio is defined as the ratio between the surface area of the suction side of the passage and the surface area of the suction side of the stator blade (8). As in the foregoing studies, as a result of systematic experiments on various sizes for the passage the results are organized in table 3. Namely, if the area of the passage is too small, the effects of the present invention become insignificant, whereas if it is too large, the essential function of the stator blade (8), that is the function of appropriately aligning the flow from the turbine to the impeller to generate increased torque, is lost. As a result of the research, only when the area ratio of the passage is in the range of 3% to 20%, the sag phenomenon is prevented and the torque increasing function is optimal.

TABLE 3

The variations in Torque Ratio and Input Capacity Factor according to the Passage Area Ratio

| | Passage Area Ratio (%) | | | | | | | | | Standard Blade |
|---|---|---|---|---|---|---|---|---|---|---|
| | 3 | 6 | 9 | 12 | 15 | 18 | 21 | 24 | 25 | (w/o passage) |
| TR | 1.90 | 1.97 | 1.98 | 1.95 | 1.93 | 1.92 | 1.78 | 1.77 | 1.65 | 1.87 |
| CF | 2.70 | 2.75 | 2.85 | 2.86 | 2.80 | 2.75 | 2.60 | 2.55 | 2.33 | 2.60 |

Furthermore, it has been determined that a passage in which the cross-sectional area is gradually enlarged in the direction of the flow brings better effects for the present invention. Namely, in the case where the cross-section is constant, the inflow speed of the passage is the same as the outflow speed to the suction side, and therefore in some rare cases the passing flow may flow as jet components and interfere with the suction side flow. However, in the case of the passage in which the cross-section is expanding in the stream-wise direction, the speed of the flow passing through the passage is faster at inflow and decreases at outflow and therefore smoothly enters the main flow at the suction side and fulfills the objective of the present invention which is reducing flow separation and recirculation without disturbing the main flow line.

In this research, as shown in table 4, findings show that when the cross-sectional area of the outlet is 10% to 30% larger in comparison to the inlet, it is the optimum state.

TABLE 4

The variations in Torque Ratio and Input Capacity Factor according to the Passage Inlet/Outlet Area Enlargement

| | Inlet/Outlet Cross-section Enlargement (%) | | | | | | Standard Blade |
|---|---|---|---|---|---|---|---|
| | 5% | 10% | 20% | 30% | 40% | 50% | (w/o passage) |
| TR | 1.90 | 1.97 | 1.98 | 1.95 | 1.93 | 1.92 | 1.87 |
| CF | 2.85 | 2.87 | 2.88 | 2.87 | 2.85 | 2.85 | 2.60 |

As clearly shown in the above description, according to the stator blade of a torque converter of the present invention, the occurrence of flow separation and recirculation in the stall state and at low speed ratios may be avoided and fluid energy loss may be minimized and, in turn, torque generation may be increased along with obtaining the effects of generating stable torque from the stall state up to a certain speed ratio. In particular, the origin that causes the sag phenomenon has been examined in a fluid mechanics perspective, and through flow analysis of the design of the present invention, substantial flow separation reduction, input capacity factor increase and stable torque have been realized.

While the present invention has been described in detail with its preferred embodiments, it will be understood that further modifications are possible. The present application is therefore intended to cover any variations, uses or adaptations of the invention following the general principles thereof, and includes such departures from the present disclosure as come within known or customary practice in the art to which this invention pertains within the limits of the appended claims.

What is claimed is:

1. A stator blade mounted in a torque converter consisting of an impeller which is attached to a crankshaft through a connecting member for integrally rotating with the crankshaft, a turbine which is rotated by the oil discharged from the impeller coaxially attached to a transmission shaft, and a stator which is attached to a fixed stator shaft through a one-way clutch for directing the flow of oil flowing back to the impeller from the turbine to the rotating direction of the impeller, the stator blade is comprised of:

said stator blade (8) having two sections (8', 8") arranged at a predetermined spacing from each other, said stator blade (8) providing a space formed by said two sections (8', 8") of an inner ring (6) and outer ring (7), said space providing a function as a slot-shaped passage (15) which passes through from the pressure side being the upstream of the flow direction to the suction side being the downstream, and said slot-shaped passage (15) on the stator blade formed within the angle range of −5° to +40°, wherein the angle is formed by the center axis of the slot-shaped passage which bisects the predetermined spacing positioned at a predetermined position on the mean camber line and the line tangent to the design flow path at the outlet point of the turbine blade.

2. The stator blade in the torque converter of claim 1, wherein said stator blade (8) forms wing-shape.

3. The stator blade in the torque converter of claim 1, wherein said stator blade (8) forms a uniform and thin sheet-shaped.

4. The stator blade of the torque converter as claimed in claim 1, wherein a distance ratio related to the passage formed on said blade (8) has the range of 12% to 38%, said distance ratio is the percentile of the distance from the leading edge to the intersecting point of the chord line and a perpendicular line starting from the intersection of the mean camber line of the stator blade (8) and the center axis of the passage, compared to the length of the whole chord which is the straight distance from the leading edge of the stator blade (8) to the trailing edge.

5. The stator blade of the torque converter as claimed in claim 1, wherein the surface area of the suction side of said passage has a size within the range of 3% to 20% of the total surface area of the suction side of the stator blade (8).

6. The stator blade of the torque converter as claimed in claim 4, wherein the surface area of the suction side of said passage has a size within the range of 3% to 20% of the total surface area of the suction side of the stator blade (8).

7. The stator blade of the torque converter as claimed in claim 1, wherein the rate of enlargement of the inlet to outlet of the passage formed in said blade (8) is within the range of 10% to 30%.

8. The stator blade of the torque converter as claimed in claim 4, wherein the rate of enlargement of the inlet to outlet of the passage formed in said blade (8) is within the range of 10% to 30%.

9. The stator blade of the torque converter as claimed in claim 5, wherein the rate of enlargement of the inlet to outlet of the passage formed in said blade (8) is within the range of 10% to 30%.

10. The stator blade of the torque converter as claimed in claim 6, wherein the rate of enlargement of the inlet to outlet of the passage formed in said blade (8) is within the range of 10% to 30%.

* * * * *